UNITED STATES PATENT OFFICE.

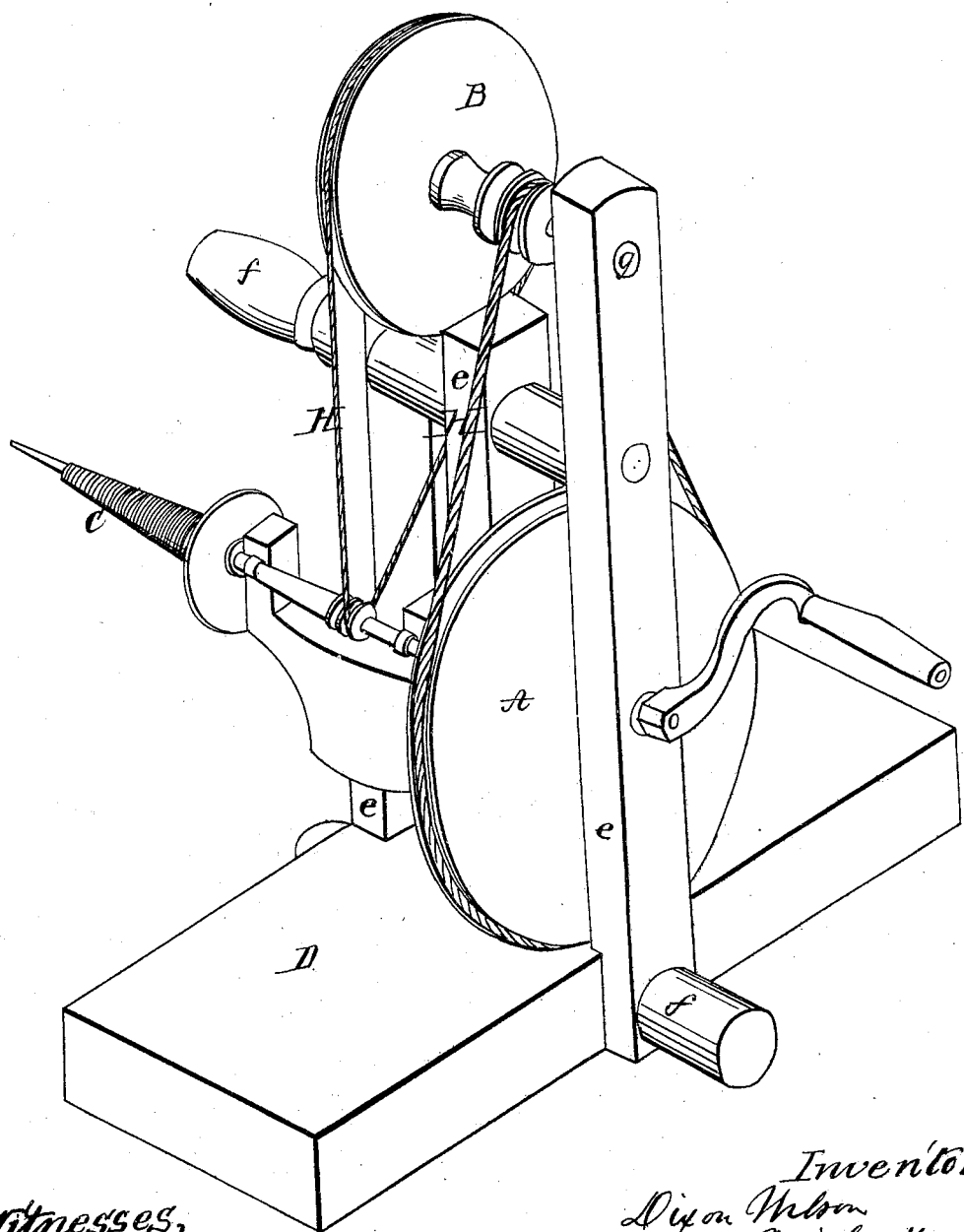

DICKSON WILSON AND HENRY FAIRBANKS, OF ADAMS COUNTY, ILLINOIS.

IMPROVEMENT IN HAND SPINNING-MACHINES.

Specification forming part of Letters Patent No. 58,015, dated September 11, 1866.

*To all whom it may concern:*

Be it known that we, DICKSON WILSON and HENRY FAIRBANKS, citizens of Adams county, Illinois, have invented a new and Improved Spinning-Wheel; and we hereby declare that the following is a full, clear, and exact description of the construction and operation of the same, reference being had to the annexed drawings, making a part of this specification, in which—

A is a wheel of about twelve inches in diameter, turned by an iron crank, and made of wood or iron; B, a wheel, say, eight inches in diameter, and turned by a cord on its axle, and connected with wheel A. C is an old-fashioned spindle turned by a cord, connected with wheel B. D is a stand, of about six by ten inches in length and breadth, and two inches thick, which may be fastened to a table or furnished with legs; e e e, three standards, about one and one-half by one inch and about twenty-one inches high, (the center one three inches shorter,) mortised into the stand—say, one and a fourth inches apart—and supporting the wheels; f f, wooden screws, allowing the parts of the machine to be separated; g g, center screws or pivots, on which the axle of the wheel B turns.

The wheels, standards, bench, and screws are to be made of hard wood, the spindle, axles, and pivot-screws of steel. The large wheel A may be made of either wood or iron.

To enable others skilled in the art to make and use our invention, we will proceed to describe its construction and operation.

We construct our spinners out of any hard tough wood, with the several parts of the above-stated dimensions; and, fitting snugly, these are held in their places by the wooden screws, made of tough well-seasoned wood.

Many parts of our machine are well known and in common use.

We are also aware that hand-spinners of different construction from ours have been so made that certain portions of the frame-work could be unscrewed and parts of the machine taken out for repairs or other purposes; but none, so far as we are aware, contain the moving parts, such as we have shown and described, held together by such a frame screwed together, and with the axis of the wheel B turning on center pivots, this latter feature allowing of a removal of the wheel with ease and of a ready adjustment for wear, as well as affording a facility for oiling.

What we claim as our invention is—

The pedestal D, with the uprights or standards e e, the driving-wheel A, the cords H H, the spindle C, the wheel B, the screws f f, and the center screws or pivots g, combined and arranged as above described, or substantially so, for the purposes therein set forth.

DICKSON WILSON.
HENRY FAIRBANKS.

Witnesses:
A. H. EVANS,
R. K. EVANS.